United States Patent [19]

Numata

[11] Patent Number: 4,542,971
[45] Date of Patent: Sep. 24, 1985

[54] AUTOMATIC FOCUSING APPARATUS

[75] Inventor: Saburo Numata, Saitama, Japan

[73] Assignee: Fuji Photo Optical Co., Ltd., Saitama, Japan

[21] Appl. No.: 656,410

[22] Filed: Oct. 1, 1984

Related U.S. Application Data

[63] Continuation of Ser. No. 421,156, Sep. 22, 1982, abandoned.

[30] Foreign Application Priority Data

Jul. 6, 1981 [JP] Japan .................................. 56-104363
Jul. 6, 1981 [JP] Japan .................................. 56-104364

[51] Int. Cl.⁴ .............................................. G03B 3/10
[52] U.S. Cl. ..................................... 354/403; 354/404; 354/406; 358/227
[58] Field of Search .......................... 354/403, 406–408, 354/404; 356/1; 250/201 AF, 201, 204; 358/227

[56] References Cited

U.S. PATENT DOCUMENTS

| 3,836,919 | 9/1974 | Matsumoto et al. | 354/403 |
| 3,936,187 | 2/1976 | Momose | 356/1 |
| 3,999,192 | 12/1976 | Hosoe et al. | 354/403 |
| 4,025,785 | 5/1977 | Mueller | 354/403 X |
| 4,257,705 | 3/1981 | Hosoe et al. | 354/403 X |
| 4,357,085 | 11/1982 | Niwa et al. | 354/403 |
| 4,441,810 | 4/1984 | Momose et al. | 354/403 X |
| 4,445,029 | 4/1984 | Nagaoka et al. | 250/201 AF |

FOREIGN PATENT DOCUMENTS 165126 12/1981 Japan ................................. 354/403

Primary Examiner—William B. Perkey
Attorney, Agent, or Firm—Young & Thompson

[57] ABSTRACT

An automatic focusing apparatus of the type having an infrared light source for illuminating a subject wherein a position sensor for sensing infrared light reflected from the subject passing through two different portions of the picture-taking lens is provided to generate signals which represent condition of the picture-taking lens, that is, whether an image of the subject is in the best focus, front focus or rear focus. The position sensor comprises two position-sensing devices. By detecting the difference between the outputs from these two position-sensing devices, the condition of the picture-taking lens can be determined. A single position-sensing device can be used if AC signals are generated by a mechanical chopper in the forward position therefrom.

6 Claims, 8 Drawing Figures

FRONT FOCUS

BEST FOCUS

REAR FOCUS

AUTOMATIC FOCUSING APPARATUS

This application is a continuation of application Ser. No. 421,156, filed 9/22/82, now abandoned.

BACKGROUND OF THE INVENTION

The present invention relates to an automatic focusing apparatus for use with optical instruments such as photographic cameras, television cameras and the like.

Various types of automatic focusing apparatus have been proposed, one of which is of the type having infrared-light-emitting means for illuminating a spot on the subject, wherein the infrared light reflected from the subject is sensed by a light-sensing means to determine automatically the distance from the apparatus to the subject to be photographed. As is well known, since this type of automatic focusing apparatus is based on a principal of triangulation, there is the disadvantage that an increased base length (the distance between the infrared-light-emitting means and the reflected light sensing means) is needed in order to measure the distance with a high accuracy. As a result, such automatic focusing apparatus tends to be of increased size.

An automatic apparatus which is proposed to eliminate the above-mentioned disadvantage is described in Japanese Open Pat. No. 54-155832 wherein the infrared light is directed to the subject through a picture-taking lens and the reflected infrared light from the subject is transmitted to an infrared sensing means through the same lens. In such apparatus, because the light sensing means receives marginal rays passing through the picture-taking lens, the center of the flux is coincident with that of the infrared sensing means when the lens is properly focused and the former is spaced apart from the latter when the lens is out of focus. However, it is necessary, in this automatic focusing apparatus, to detect a peak output from the light sensing means, by providing a sample hold circuit, a peak value holding circuit and the like. As a result of this, the latter automatic focusing apparatus is complex in construction.

OBJECTS OF THE INVENTION

It is therefore the principal object of the present invention to provide an automatic focusing apparatus simplified in construction.

It is another object of the present invention to provide an automatic focusing apparatus wherein the directions of deviation of the flux on an infrared light sensing means can be easily detected to determine whether an image of a subject to be photographed is in best focus, front focus or rear focus.

SUMMARY OF THE INVENTION

The above-mentioned objects of the present invention are achieved by using position sensing means for providing signals in response to positions thereon of incident light passing through a picture-taking lens at two different portions thereof, said signals representing the condition of the picture-taking lens, that is, whether the image of the subject to be photographed is in best focus, front focus or rear focus.

In a preferred embodiment of the present invention, signals of focus information are obtained as the differences between the outputs from two position sensing devices. In another preferred embodiment of the present invention, signals of focus information are obtained as alternating current (AC) signals by utilizing alternately the outputs from two position sensing devices. In order to obtain AC signals, the outputs from the two position sensing devices located at opposite sides of the optical axis of the picture-taking lens are alternately chopped by a chopping circuit.

Alternatively, a signal position sensing device is located on the optical axis with a rotatable sector means provided forwardly thereof so that images of a subject by infrared light passing through both of the upper and lower marginal portions of the picture-taking lens are alternately focused on the position sensing device. It is preferred to use a non-scanning type of position sensing device (PSD hereinafter) as the position sensing device mentioned above.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
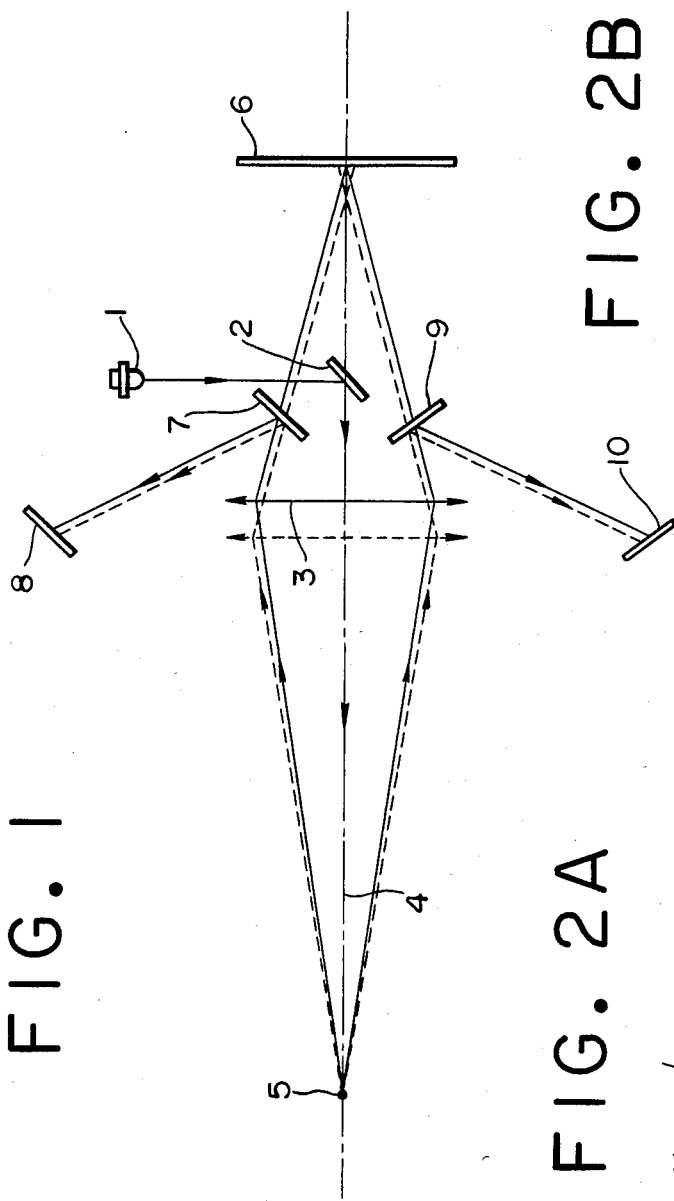
FIG. 1 shows the basic optical configuration of an automatic focusing apparatus according to the present invention.

Referring now to FIG. 1 of the drawings, one embodiment of rangefinding apparatus according to the present invention is disclosed as it might operate in a photographic camera. An infrared light emitting means 1 such as, for instance, a light emitting diode emits infrared light (the "infrared" light may include radiation from infrared to near infrared). Light from the infrared light emitting means 1 incident upon a mirror 2 at an angle 45° is reflected thereby, moving along the optical axis 4 of a picture-taking lens 3 of a camera, and thus illuminating a spot on the subject 5. The mirror 2 is located on the optical path 4 at an angle of 45° as shown in FIG. 1. The light is reflected by the subject 5 and is focused on an image plane 6 (which is, in the case of a photographic camera, the film plane) through the picture-taking lens 3. It will be apparent from FIG. 1 that a portion of the light from the subject 5 which passes through the picture-taking lens 3 at a marginal portion (the upper portion in FIG. 1) thereof is focused on and sensed by a first portion sensing means 8 after reflection by a mirror 7. It should be noted that the first position sensing means 8 is located in a conjugate plane of the image plane 6. It is of course to be understood that the image formed on the photographic film is an image of the subject by visible light, while, on the first position sensing means, an image of the subject 5 by infrared light is formed. The location of the first position sensing means 8 will also take into consideration color aberrations because of the difference in the refractive index with visible light and with infrared light. In a single lens camera, a swing mirror assembly can be positioned between the picture-taking lens 3 and the image plane 6, with the mirrors 2, 7 and 9 located in that assembly as shown in FIG. 1.

On the other hand, a portion of the light from the subject 5 which passes through the picture-taking lens 3 at another marginal portion (the lower portion in FIG. 1) thereof is focused on and sensed by a second position sensing means 10 after reflection by a mirror 9. Such first and second position sensing means 8 and 10 are located in such manner that images of the subject 5 are focused on the first and second position sensing means 8 and 10 at their centers when the picture-taking lens 3 is adjusted to sharply focus the image of the subject 5 on the image plane 6. In FIG. 1, the optical paths shown by the solid lines means that the picture-taking lens 3 is adjusted to focus sharply an image of the object on the image plane (it is called "best focus" hereinafter). But the optical path drawn by the dotted lines means that the picture-taking lens 3 is adjusted to focus an image of the subject 5 in front of the image plane (this is called "front focus" hereinafter).

Because the light reflected from the subject 5 may include infrared light emitted by other infrared light emitting sources such as a flash lamp and the like, appropriate filtering of the outputs of first and second position sensing means 8 and 10 is necessary in order to distinguish the desired signals. This filtering may be accomplished by, for instance, providing a beam frequency with which outputs of said position sensing means 8 and 10 are resonant.

Figure 2B:
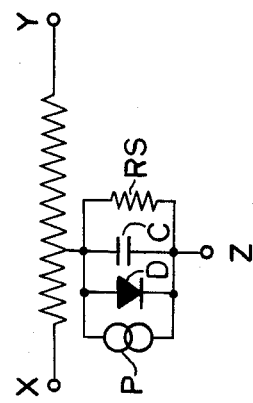
FIG. 2B is a circuit diagram showing an equivalent circuit to the PSD shown in FIG. 2A.
Figure 2A:
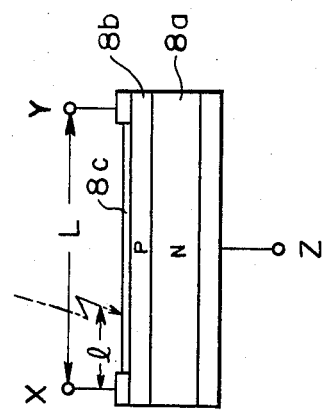
FIG. 2A is a diagrammatic sectional view of a PSD.

FIG. 2A is a sectional view showing a PSD used as position sensing means in the present invention, wherein a photo-diode in P-N conjunction is formed by superposing a P-type resistance layer 8b on an N-type high resistance silicon substrate 8a. The photo-diode is provided with a long wave band pass filter 8c for infrared light. It should be noted that, by regulating the depth of diffusion so as to be more sensitive to a long wave band, the long wave band pass filter 8c can be eliminated.

The electrical charge produced by light striking an incident point on the PSD is transmitted to the resistance layer as a photo-current proportional to the light energy falling thereon and is divided according to a ratio equal to the inverse of the respective resistance values between the light incidence point and each of electrodes X and Y. Therefore, the currents Ix and Iy produced at electrodes X and Y, respectively, are given by the following equations:

$$Ix = Io \cdot \frac{RL - Rl}{RL}, \quad Iy = Io \cdot \frac{Rl}{RL}$$

where Io is the photo-current produced by the incident light, L and RL are, respectively, the distance and the resistance between the electrodes X and Y, and l and Rl are, respectively, the distance and the resistance between the electrode X and the light incidence point. Assuming that the resistance layer is uniform in thickness and therefore the resistance is proportional to distance, the equations are reduced as follows:

$$Ix = Io \cdot \frac{L - l}{L}, \quad Iy = Io \cdot \frac{l}{L}$$

Consequently, the ratio of Ix to Iy is determined in accordance with the following relationship:

$$Ix/Iy = \frac{L - l}{L} = \frac{L}{l} - 1$$

As is obvious from the relationship, the point of light incidence on the PSD can be determined independently of the amount of incident light energy.

FIG. 2B shows an equivalent circuit of the PSD shown in FIG. 2A wherein it is considered that infinitesimally small elements comprising photo-diode D, suspended capacitor C and shunt resistance Rs in combination are one-dimensionally distributed and coupled through a resistance of the resistance layer. Thus the incidence of light onto one of the elements is considered to be equivalent to the application of an electromotive force P with a constant current to the elements, leading to the generation of a current distributed between the electrodes X and Y.

Figure 3:
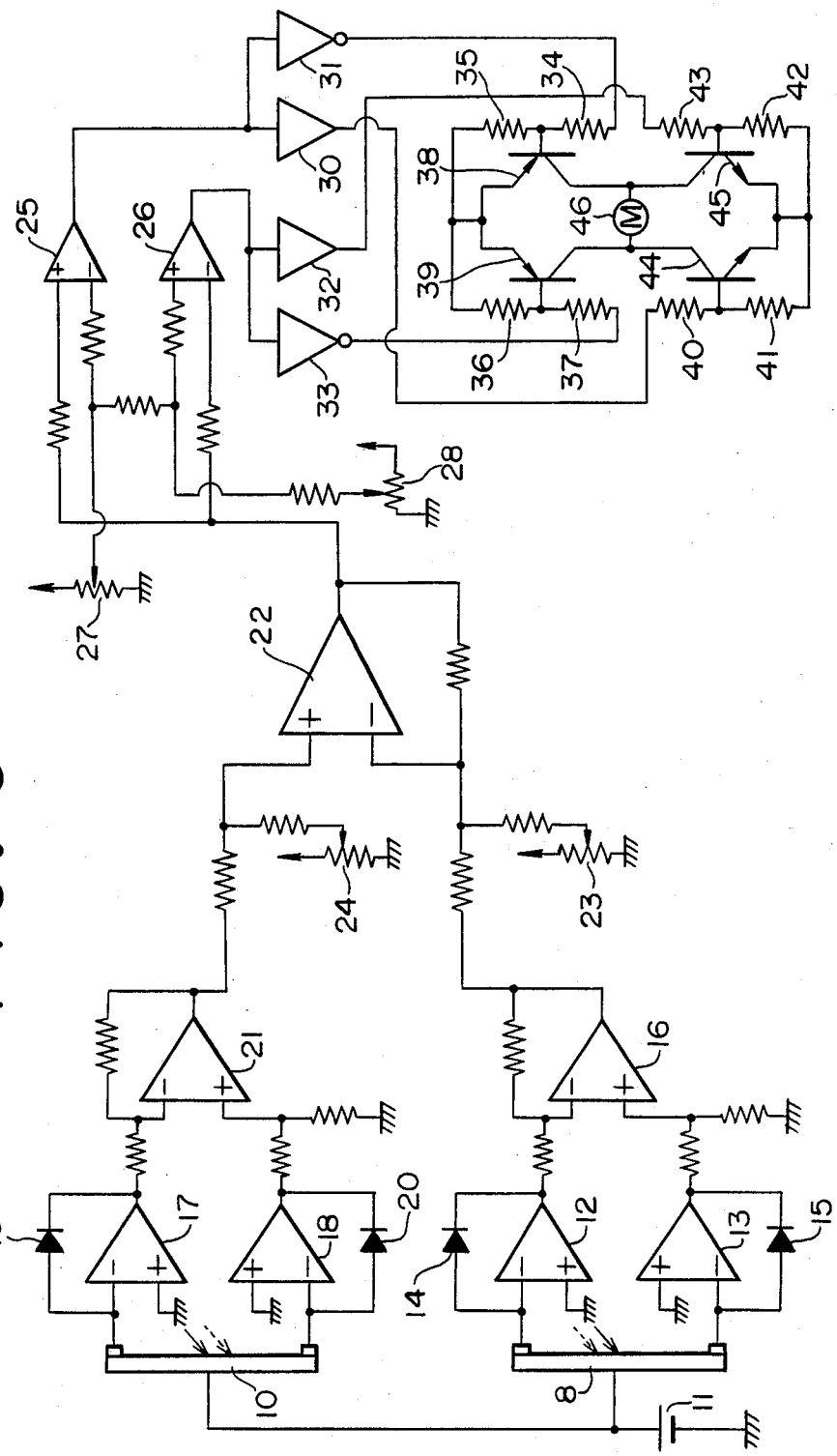
FIG. 3 is a circuit diagram of an automatic focusing apparatus according to a preferred embodiment of the present invention, wherein adjusted picture-taking lens positions are determined by the difference between the outputs from the PSDs.

FIG. 3 shows a circuit useful in an automatic focusing apparatus according to a preferred embodiment. In FIG. 3, a power source 11 is connected to a common electrode of the PSDs 8 and 10 so as to supply the amounts of current shared in dependence on the point on the PSDs 8 and 10 on which infrared light reflected from a subject impinges. As noted above, the optical path denoted by the solid lines means that the picture-taking lens 3 is adjusted to form an image in best focus. In this condition, both of the PSDs are the same in output voltage. On the other hand, when the picture-taking lens 3 is adjusted to form an image in front focus as shown by the dotted lines in FIG. 1, the output voltage from the circuit including the PSD 8 is higher than that from the other including the PSD 10. The currents at the output electrodes of the PSD 8 are transmitted to a substractor circuit comprising an operational amplifier 16 through current-voltage (in the form of logarithmically compressed voltage) conversion circuits comprising amplifiers 12 and 13, and logarithmic compression diodes 14 and 15 in negative feedback circuits to determine an output voltage in dependence on the portion of the PSD 8 on which infrared light impinges. In the same way as described for PSD 8, the currents at the output electrodes of the PSD 10 are transmitted to a substractor circuit comprising an amplifier 21, through current-voltage conversion circuits comprising amplifiers 17 and 18, and logarithmic compression diodes 14 and 15 in negative feedback circuits, to determine an output voltage in dependence on the portion of the PSD 10 on which infrared light impinges. The outputs from the respective amplifiers 16 and 21 are transmitted to a differential amplifier 22 to calculate the difference therebetween.

The difference will be zero when the picture-taking lens is adjusted to form an image in best focus, so no output voltage will be provided at the output terminal of the differential amplifier. But since the output voltage from the PSD 8 will be higher than that from the other when the picture-taking lens 3 is adjusted to form an image in front focus, a low output voltage will be provided at the output terminal of the differential amplifier 22. Contrariwise, when the picture-taking lens 3 is adjusted to form an image in rear focus, a high output voltage will be provided. It will be understood that the amount of output voltage from differential amplifier 22 is proportional to the amount of de-focus. In this embodiment the proportion can be varied by adjusting potentiometers 23 and 24 connected to respective input terminals of the differential amplifier 22.

As shown in FIG. 3, the differential amplifier 22 at its output terminal is connected to both a non-inversion input terminal of a comparator 25 and an inversion input terminal of a comparator 26. The other input terminals of the respective comparators 25 and 26 are supplied with a reference voltage provided by potentiometers 27 and 28, respectively. To the output terminals of the comparators 25 and 26, buffers 30 and 32 and inverters 31 and 33 are connected, respectively. The output terminals of the respective inverters 31 and 33 are interconnected through resistors 34–37. To the junction between resistors 34 and 35 the base of a transistor 38 is connected; and to the junction between the resistors 36 and 37 the base of a transistor 39 is connected. Furthermore, the buffers 30 and 32 at their output terminals are interconnected through resistors 40–43. To the junctions between the resistors, the bases of the transistors 44 and 45 are connected, respectively. These transistors 38, 39, 44 and 45 constitute a bridge circuit to which a driving motor 46 is connected. The driving motor 46 is controlled to rotate, causing the picture-taking lens 3 to move back or forth in accordance with whether the image is in front focus or in rear focus, and to stop when the image is in best focus. The condition of rotation of the motor 46 is shown in Table 1.

51. The amplifier 51 at its output terminal is connected to both the non-inversion input terminal of a comparator 54 and the inversion input terminal of a comparator 55. To the other input terminal of the respective comparators 54 and 55 reference voltages provided respectively by potentiometers 56 and 57 are applied.

The output from the comparator 54 is fed to both of NAND circuits 58 and 59, while the output from the comparator 55 is fed to both of NAND circuits 60 and 61. To the NAND circuits 58 and 60 clock pulses generated by the oscillator 52 are input to obtain a logical product of themselves and the output from the comparator 54; while to the NAND circuits 59 and 61 inverted clock pulses from an inverter 62 are input to obtain a logical product of themselves and the output from the comparator 55. It is apparent in FIG. 4 that both of the outputs from the respective NAND circuits 59 and 60 are input to a NAND circuit 63 to which at its output terminal a buffer 30 and inverter 31 are connected; and both of the outputs from the respective NAND circuits 58 and 61 are input to another NAND circuit 64 to which at its output terminal a buffer 32 and inverter 33 are connected.

Figure 5:
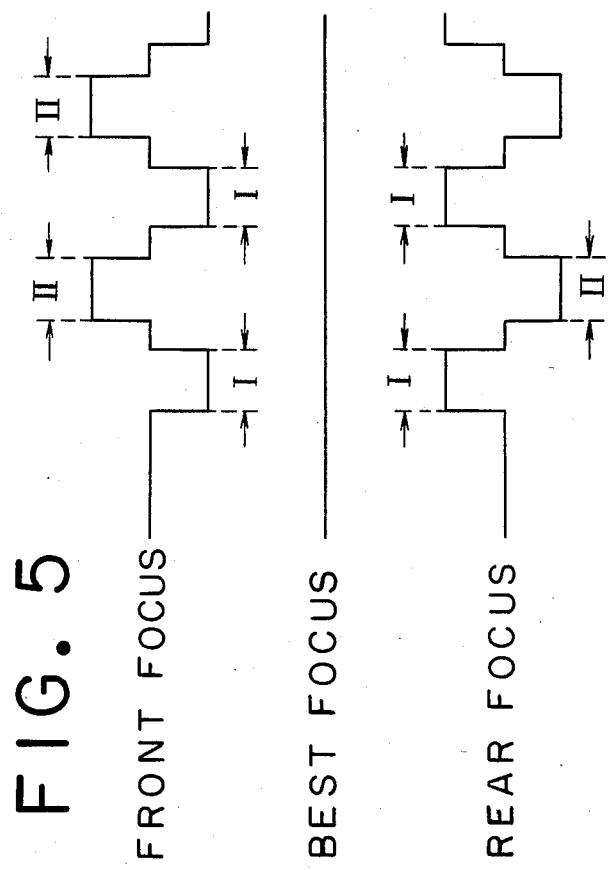
FIG. 5 is a diagram showing waveforms illustrating the operation of the amplifier used in the circuit shown in FIG. 4.

As mentioned above, the outputs are utilized alternately from the PSDs 8 and 10 by means of chopper circuit 50; thus AC signals shown in FIG. 5 will be provided in accordance with the condition of adjustment of the picture-taking lens 3. In FIG. 5, "I" represents the interval during which the chopper circuit 16 utilizes outputs from the PSD 10; while "II" represents the interval during which the output from the PSD 8 is utilized.

The AC signal extracted by means of chopper circuit 50 is transmitted to the comparators 54 and 55, after amplification by the inversion amplifier 51, to be compared with the respective reference voltages. With logical operation of the outputs from the comparators 54 and 55 by the logic circuit comprising the NAND cir-

TABLE 1

| FOCUS | DIFFERENTIAL AMPLIFIER 22 | COMPARATOR 25 | COMPARATOR 26 | INVERTER 31 | INVERTER 33 | BUFFER 30 | BUFFER 32 | MOTOR 46 |
|---|---|---|---|---|---|---|---|---|
| FRONT FOCUS | LOW VOLTAGE | L | H | H | L | L | H | REVERSE |
| BEST FOCUS | 0 | L | L | H | H | L | L | STOP |
| REAR FOCUS | HIGH VOLTAGE | H | L | L | H | H | L | NORMAL |

Figure 4:
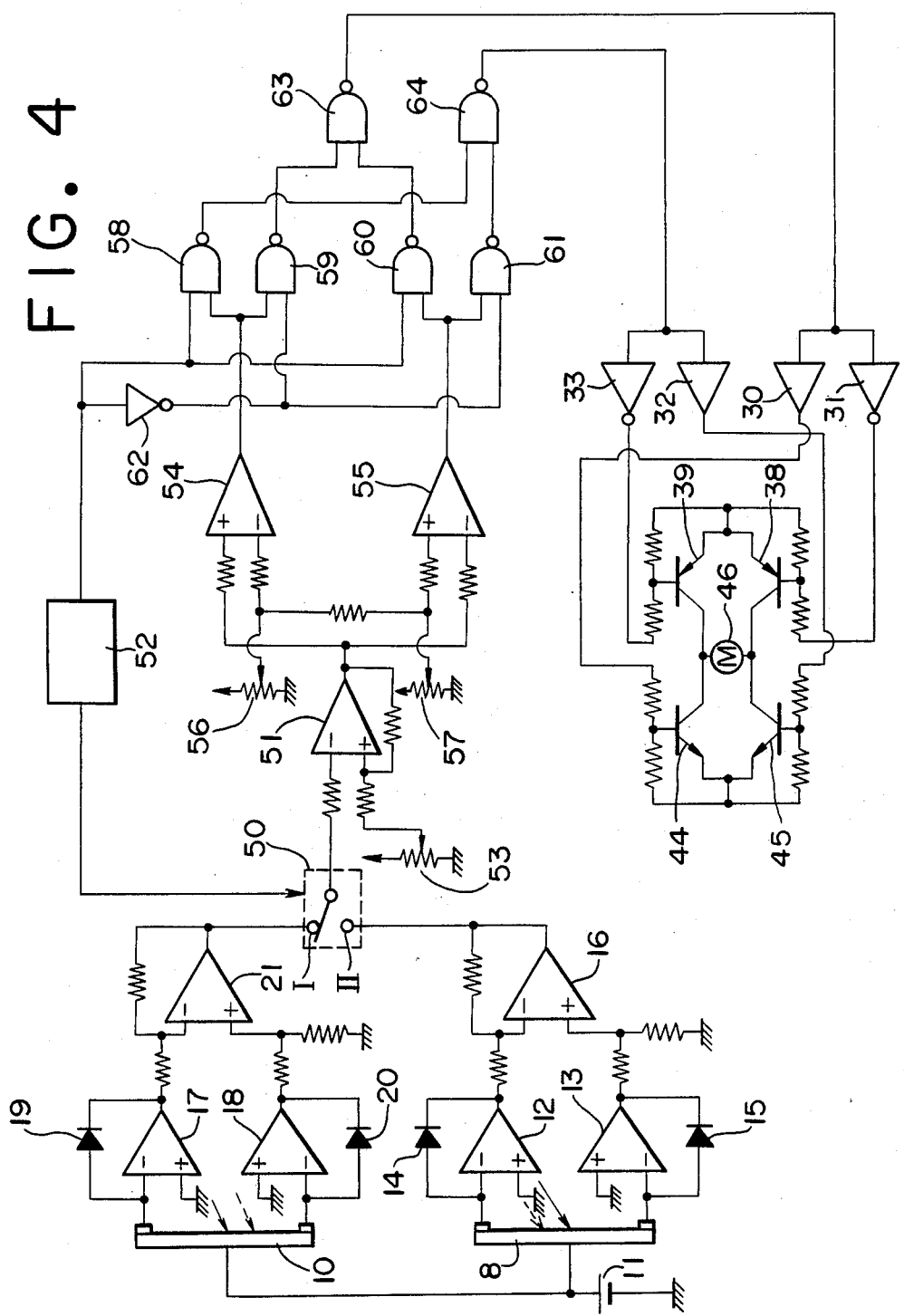
FIG. 4 is a circuit diagram of an automatic focusing apparatus according to another preferred embodiment of the present invention, wherein adjusted picture-taking lens positions are determined by the difference between outputs from the PSDs, said outputs being alternately utilized to provide alternating current (AC) signals.

FIG. 4 shows a circuit using an automatic focusing apparatus according to another preferred embodiment, wherein outputs from the PSDs are alternately utilized to provide AC signals. In this embodiment like parts as shown in FIG. 3 are designated by like reference numerals. Outputs are alternately utilized from the PSDs by means of chopper circuit 50 which is driven with clock pulses from an oscillator 52, and then is fed to an inversion amplifier 51. The inversion amplifier 51 at its non-inversion input terminal is connected to a potentiometer 53 for offset regulation of the inversion amplifier cuits 58, 59, 60, 61, 63 and 64, it is determined in relation to a condition of the chopper circuit 50 whether the image of an object is in best focus, front focus or rear focus.

The outputs from the respective circuits in accordance with the condition of focus are shown in Table 2, wherein the clock pulse output generated by the oscillator 54 is assumed to be "H" (high) when the chopper circuit 50 is in the state of "I" and to be "L" (low) when the state of the chopper circuit 50 is "II".

TABLE 2

| FOCUS | CHOPPER CIRCUIT 50 | COMPARATOR 54 | COMPARATOR 55 | NAND CIRCUIT 58 | NAND CIRCUIT 59 | NAND CIRCUIT 60 | NAND CIRCUIT 61 | NAND CIRCUIT 63 | NAND CIRCUIT 64 | INVERTER 31 | INVERTER 33 | BUFFER 30 | BUFFER 32 | MOTOR 46 |
|---|---|---|---|---|---|---|---|---|---|---|---|---|---|---|
| FRONT FOCUS | I | H | L | L | H | H | H | L | H | H | L | L | H | REVERSE |
|  | II | L | H | H | H | H | L | L | H | H | L | L | H |  |
| BEST FOCUS | I | L | L | H | H | H | H | L | L | H | H | L | L | STOP |
|  | II | L | L | H | H | H | H | L | L | H | H | L | L |  |
| REAR | I | L | H | H | H | L | H | H | L | L | H | H | L | NORMAL |

TABLE 2-continued

| | CHOPPER CIRCUIT | COMPARATOR | NAND CIRCUIT | | | | | | INVERTER | BUFFER | MOTOR | |
| --- | --- | --- | --- | --- | --- | --- | --- | --- | --- | --- | --- | --- |
| | 50 | 54 | 55 | 58 | 59 | 60 | 61 | 63 | 64 | 31 | 33 | 30 | 32 | 46 |
| FOCUS II | H | L | H | L | H | H | H | L | L | H | H | L |

Figure 6:
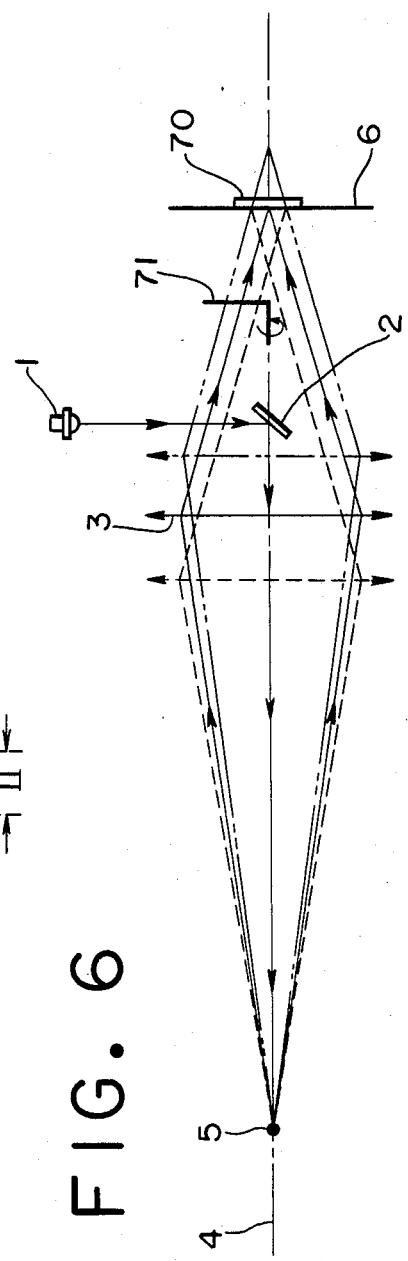
FIG. 6 shows another basic optical configuration of the automatic focusing apparatus according to a further preferred embodiment of the present invention wherein a mechanical chopper means is used to produce AC signals from a single PSD in place of two PSDs.

FIG. 6 shows another preferred embodiment of an automatic focusing apparatus which is of the type having a single PSD. In this embodiment, a single PSD 70 is located with its surface perpendicular to and lying on the optical axis 4 of the picture-taking lens 3. Forwardly of PSD 70 there is provided a rotatable sector 71 with a 120° aperture which allows the PSD to receive infrared light passing through the upper half and the lower half of the picture-taking lens 3, alternately.

Figure 7:
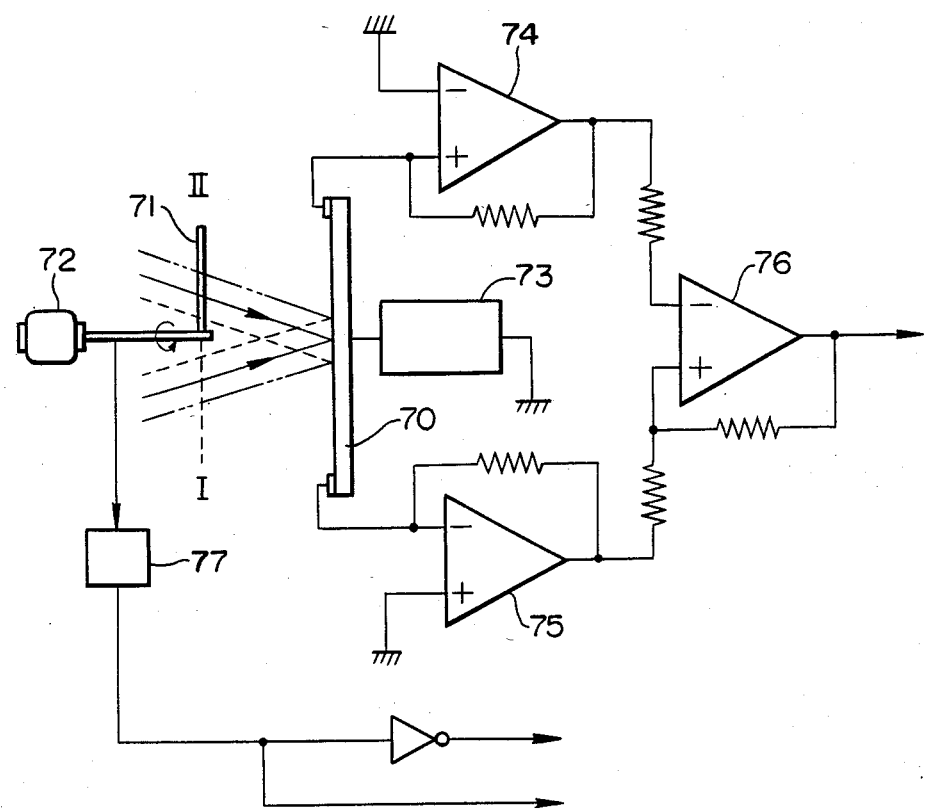
FIG. 7 is a circuit diagram used in the automatic focusing apparatus shown in FIG. 6.

FIG. 7 shows a circuit for use with the embodiment of FIG. 6. When the sector 71 driven by a motor 72 is in its lower position "I" (dotted line illustration) with approximately the lower half of the picture-taking lens 3 covered thereby, the PSD 70 receives infrared light passing through approximately the upper half of the picture-taking lens 3. On the other hand, the PSD 70 can receive infrared light passing through approximately the lower half of the picture-taking lens 3 when the sector 71 is at its upper position "II". It is to be noted in the drawing that solid lines mean best focus, that dotted lines mean front focus and that double dot-dash lines mean rear focus.

The PSD 70 with its substrate connected to a power supply 73 and with each electrode of its resistance layer connected to one of the input terminals of amplifiers 74 and 75 supplies a current output corresponding to a resistance value, from the position of light incidence to an electrode, to both of the operational amplifiers 74 and 75. The outputs from the operational amplifiers 74 and 75 are supplied to the input terminals of a differential amplifier 76 to obtain a difference therebetween. AC signals shown in FIG. 5 can be generated from the differential amplifiers 76 in the same way as described in connection with the embodiment using two PSDs.

A position detector 77 for detecting positions of the sector 71 is adapted to generate a high level of signal "H" when the sector 11 covers the lower half of the picture-taking lens 3, that is, the sector 71 is in its position "I" shown by a dotted line. On the contrary, when the sector 71 is in its position "II" as shown by solid lines, the position detector 77 generates a lower level of signal "L". Therefore, that part of the picture-taking lens 3 through which passes the infrared light falling on the PSD 70, is identified in accordance with the state of the signal from the position detector 77, that is, whether the level of signal is "H" or "L". The differential amplifier 76 and the position detector 77 correspond to the differential amplifier 51 and the oscillator 52, respectively, in FIG. 4; and hence the motor 46 can be controlled to adjust the picture-taking lens 3 in the same manner as described in connection with the embodiment shown in FIG. 4.

As can be understood by those skilled in the art, various changes and modifications may be made to the present invention without departing therefrom as defined in the appended claims.

What is claimed is:

1. Automatic focusing apparatus for use with optical apparatus in which a picture-taking lens is moved along its optical axis to focus an image of an object on an image plane, said apparatus comprising:

means for illuminating said object with a spot-like infrared light along said optical axis;

first non-scanning type position sensing means located in a plane substantially conjugated with said image plane for sensing the spot-like infrared light reflected from said object passing through a marginal portion of said picture-taking lens to provide a first signal according to the incident position thereon of said reflected infrared light and comprising a pair of electrodes that are spaced apart by means generating an electric current upon the receipt of infrared light, said generating means producing current which is divided between said electrodes according to a ratio equal to the inverse of the respective differences between the distances between said electrodes and said reflected spot-like infrared light;

second non-scanning type position sensing means located in another plane substantially conjugated with said image plane for sensing the spot-like infrared light reflected from said object passing through another marginal portion of said picture-taking lens to provide a second signal according to the incident position thereon of said reflected infrared light and comprising a pair of electrodes that are spaced apart by means generating an electric current upon the receipt of infrared light, said generating means producing current which is divided between said electrodes according to a ratio equal to the inverse of the respective differences between the distances between said electrodes and said reflected spot-like infrared light;

means for alternately utilizing outputs from said first and second signals to produce an AC signal when said image is in front focus or rear focus, the AC signal for front focus differing from the AC signal for rear focus by 180 degrees, the amplitude of the AC signal being directly proportional to the magnitude of the difference between the front or rear focus and the best focus;

means for detecting the state of focus of said picture-taking lens as a function of the relation between the phases of said AC signal and said utilizing means; and means for moving said picture-taking lens along its axis in accordance with the output from said detecting means in a direction to reduce said amplitude of the AC signal to zero.

2. Automatic focusing apparatus as defined in claim 1 in which said first and second non-scanning type position sensing means are disposed in symmetry about said optical axis and said first and second signals are alternately sampled by a chopper circuit.

3. Automatic focusing apparatus as defined in claim 1 in which said first and second non-scanning type position sensing means are spaced apart from each other by an angle of 180° about said optical axis.

4. Automatic focusing apparatus for use with optical apparatus wherein a picture-taking lens is moved along its optical axis to focus an image of an object on an image plane, said apparatus comprising:

means for illuminating said object with a spot-like infrared light along the optical axis of the picture-taking lens;

a first non-scanning type position sensing means for sensing the spot-like infrared light reflected from said object passing through a marginal portion of said picture-taking lens to provide a first signal according to the incident position of said reflected infrared light, said first non-scanning type position sensing means being located in a plane substantially conjugated with said image plane and comprising a pair of electrodes that are spaced apart by means generating an electric current upon the receipt of infrared light, said generating means producing current which is divided between said electrodes according to a ratio equal to the inverse of the respective differences between the distances between said electrodes and said reflected spot-like infrared light;

a second non-scanning type position sensing means for sensing the spot-like infrared light reflected from said object passing through another marginal portion of said picture-taking lens to provide a second signal according to the incident position of said reflected infrared light, said second non-scanning type position sensing means being located in another plane substantially conjugated with said image plane and comprising a pair of electrodes that are spaced apart by means generating an electric current upon the receipt of infrared light, said generating means producing current which is divided between said electrodes according to a radio equal to the inverse of the respective differences between the distances between said electrodes and said reflected spot-like infrared light;

said sensing means being adapted to provide said signals of the same voltage only when said image is in best focus and to provide said signals of voltages that differ from each other when said image is spaced from said focal plane, with the difference of said voltages from each other varying directly as the distance of said image from said focal plane;

means for detecting a difference of signal between said first and second non-scanning type position sensing means; and adjusting means for moving said picture-taking lens in a direction to reduce said difference for sensing the spot-like infrared light reflected from said object passing through another marginal portion of said picture-taking lens to provide a second signal according to the incident position of said reflected infrared light, said second non-scanning type position sensing means being located in another plane substantially conjugated with said image plane;

means for detecting a difference of signal between said first and second non-scanning type position sensing means; and adjusting means for moving said picture-taking lens in a direction to reduce said difference.

5. Automatic focusing apparatus as defined in claim 4, further comprising first and second reflecting members at opposite sides of said optical axis so as to reflect and direct the infrared light reflected from said object toward said first and second non-scanning type position sensing means.

6. Automatic focusing apparatus as defined in claim 4 in which said adjusting means comprises a motor for moving the picture taking lens along said optical axis, first and second comparators which provide signals at different levels by comparing an output from a difference detecting means with a predetermined reference signal whenever said difference detecting means provides a differential output, and a bridge circuit for controlling the direction of rotation of said motor.

* * * * *